Oct. 11, 1949.    R. F. MALLINA    2,484,106
MECHANICAL PAGE TURNER
Filed April 10, 1946    5 Sheets-Sheet 1
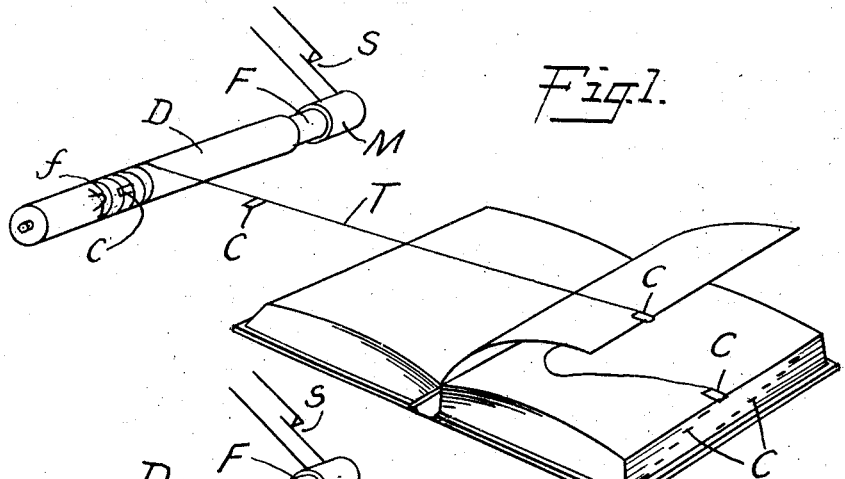
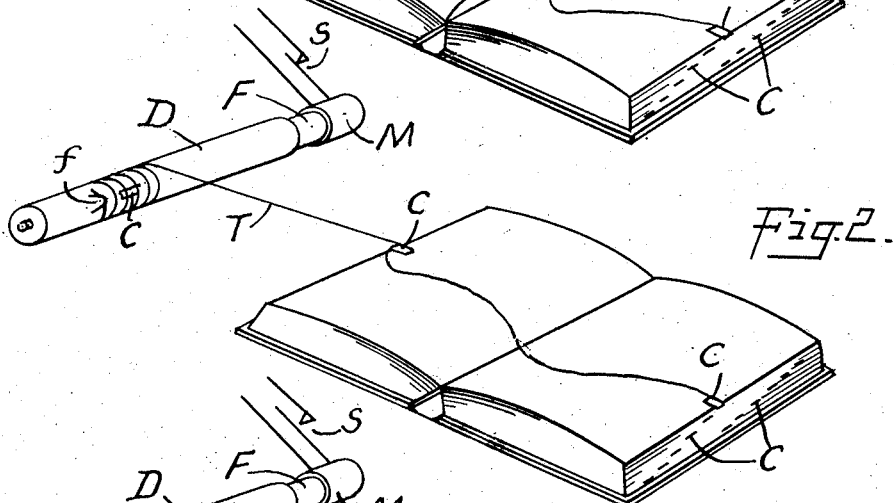
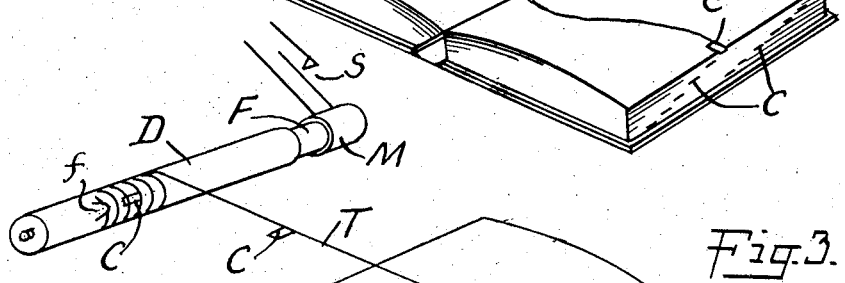
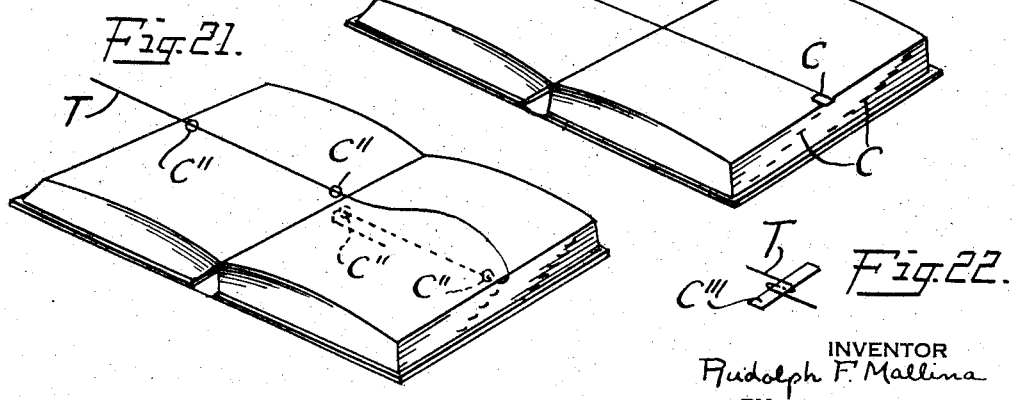
INVENTOR
Rudolph F. Mallina
BY
Pennie, Edmonds, Morton & Barrows
ATTORNEYS

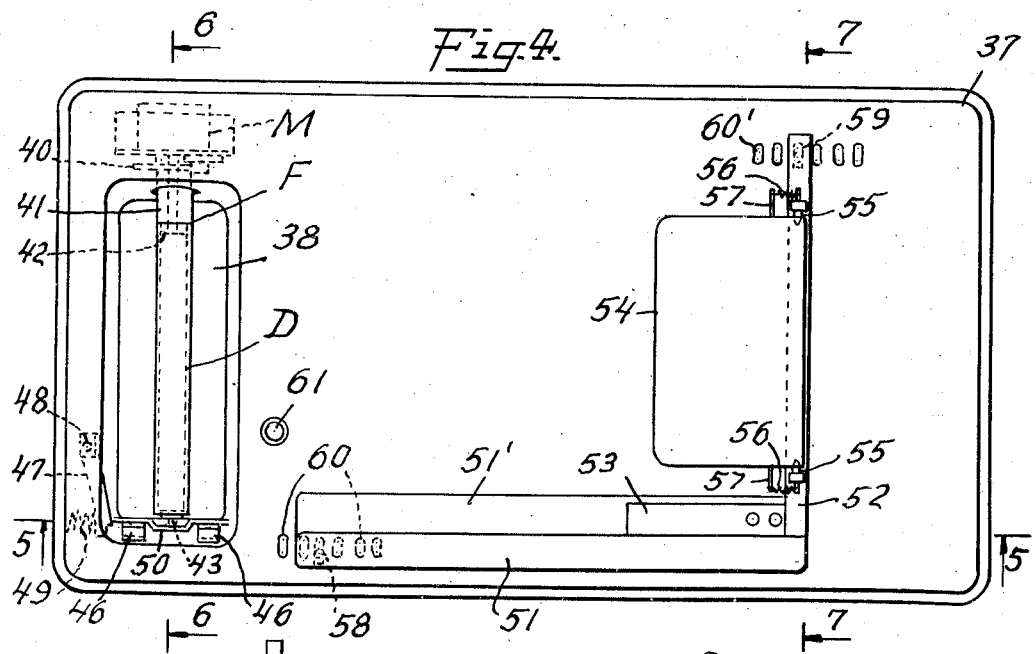
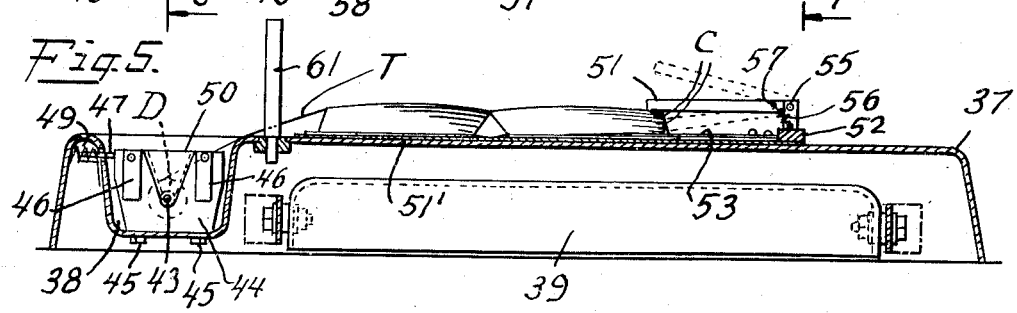
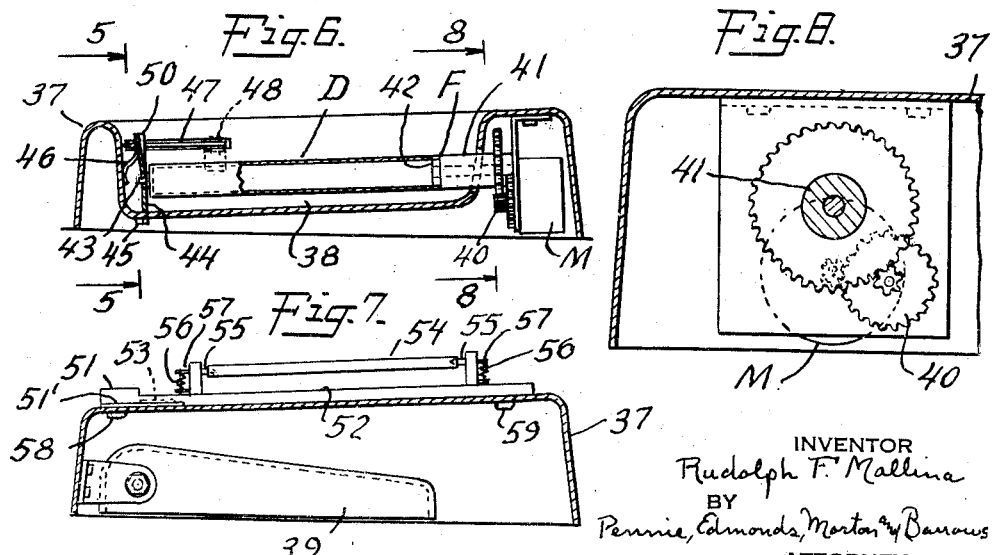

Oct. 11, 1949.　　　　　R. F. MALLINA　　　　　2,484,106
MECHANICAL PAGE TURNER
Filed April 10, 1946　　　　　　　　　　　　　　　5 Sheets-Sheet 3
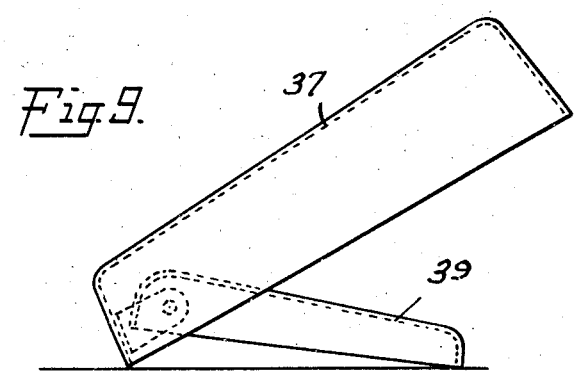
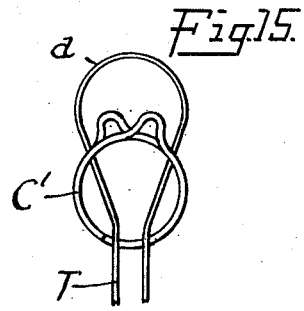
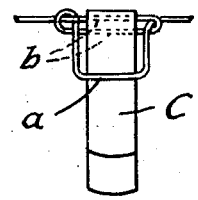
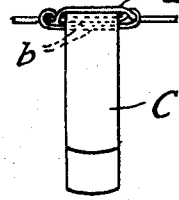
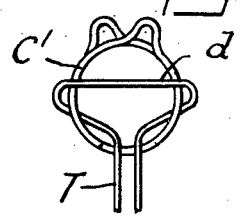
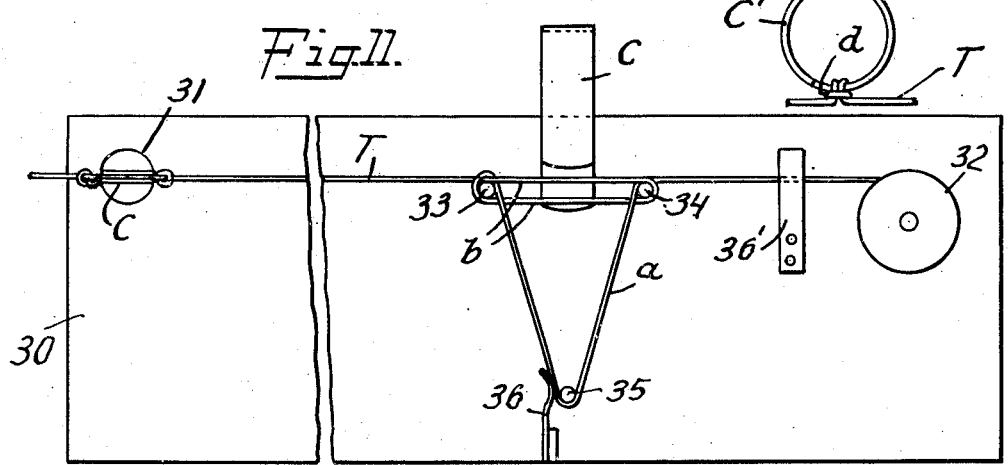
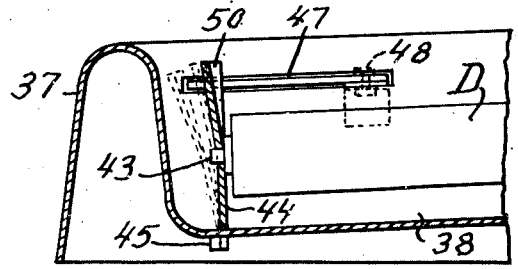
INVENTOR
Rudolph F. Mallina
BY
Pennie, Edmonds, Morton and Barrows
ATTORNEYS Oct. 11, 1949.　　　　R. F. MALLINA　　　　2,484,106
MECHANICAL PAGE TURNER
Filed April 10, 1946　　　　　　　　　　5 Sheets-Sheet 4
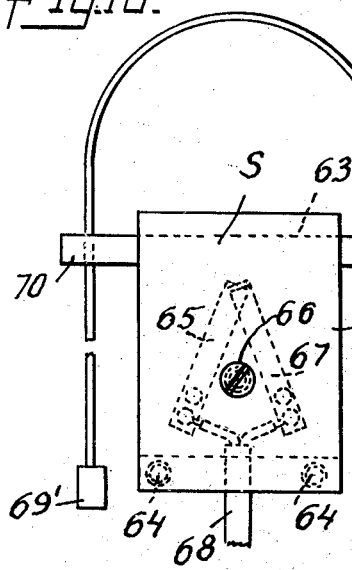
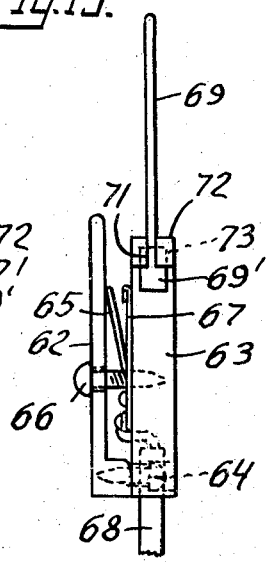
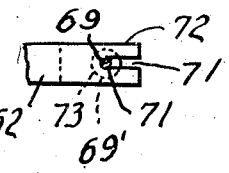
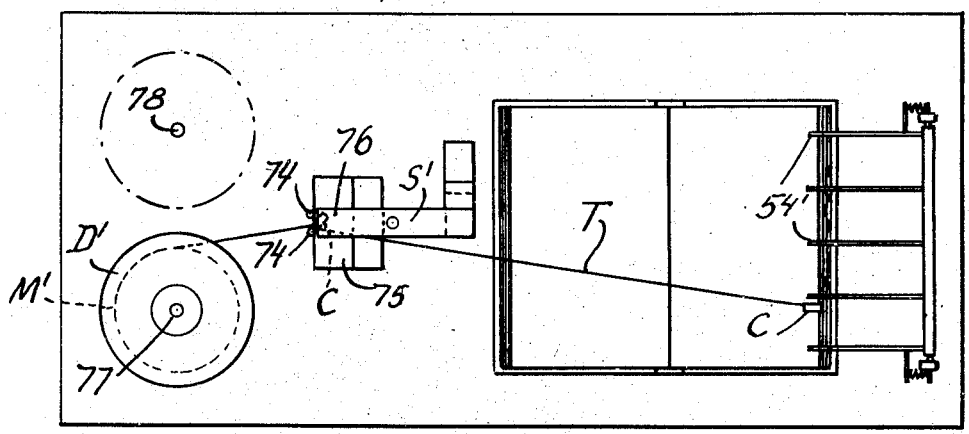
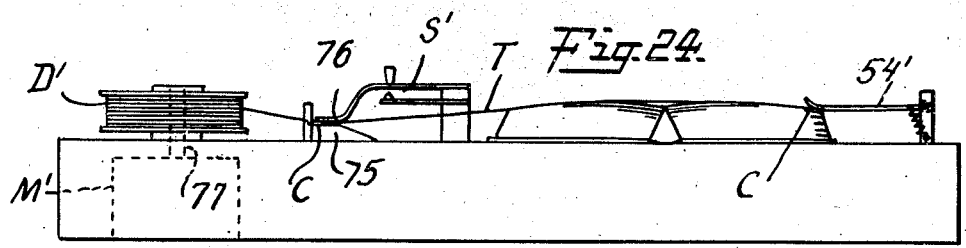
INVENTOR
Rudolph F. Mallina
BY
Pennie, Edmonds, Morton and Barrows
ATTORNEYS

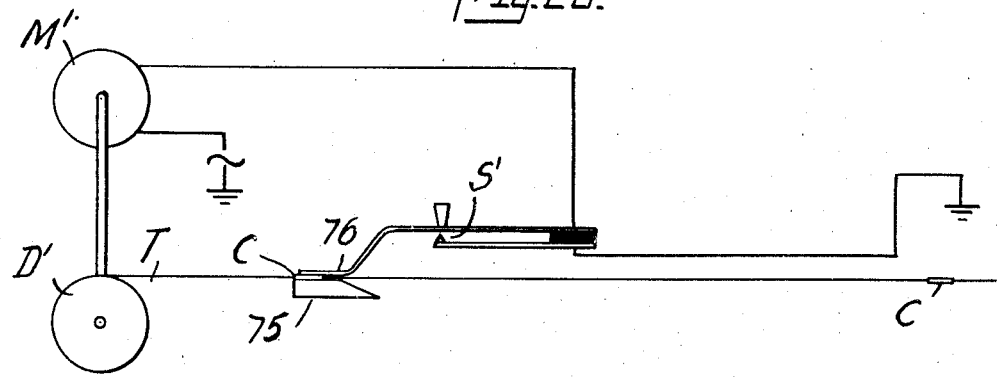
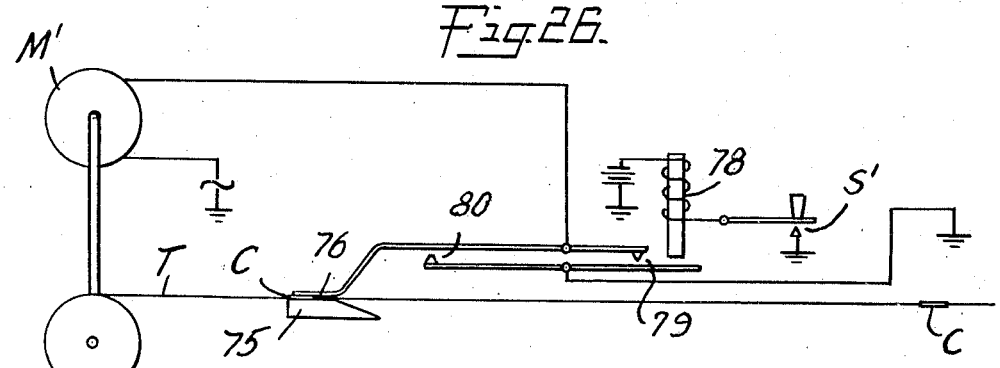
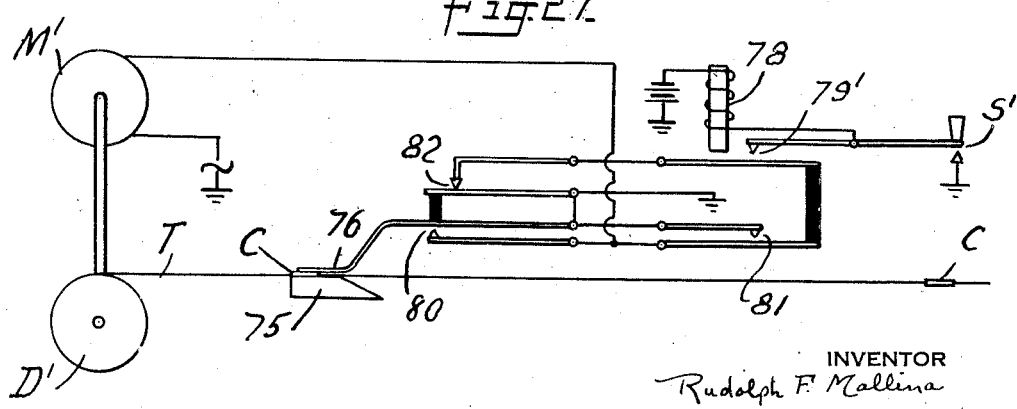
INVENTOR
Rudolph F. Mallina
BY
Pennie, Edmonds, Morton and Barrows
ATTORNEY Patented Oct. 11, 1949

2,484,106

UNITED STATES PATENT OFFICE 2,484,106

MECHANICAL PAGE TURNER

Rudolph F. Mallina, Hastings on Hudson, N. Y., assignor to Aeronautical Research Corporation, New York, N. Y., a corporation of Delaware Application April 10, 1946, Serial No. 661,031

20 Claims. (Cl. 40—104)

This invention relates to mechanical page turners, and has for its object the provision of a novel and improved device of this character.

The mechanical page turner of the invention is a device for mechanically turning in numerical sequence the pages of a book or the like. It is primarily intended for persons who have lost the use of their arms, and who therefore require the almost constant presence of an attendant to turn the pages of their reading matter. Such reading matter is, for the sake of simplicity, herein generically referred to as a book, which is to be understood as including magazines, newspapers, pamphlets and all other reading matter in page form.

In the page turner of the invention, the force necessary to turn the page is applied by a long thread or string. Small clips or the like are fastened to the thread at spaced intervals, generally slightly greater than twice the page width of the book. The clips are adapted to be attached in sequence to the front marginal edge of successive pages of the open book resting on an appropriate support. The pages are lifted and gradually turned over, by pulling the thread over a winding means, such as a motor-driven drum or the like, so that the thread travels unimpededly across the face of the open book. Thus, in its broad aspect, the page turner of the invention comprises a book support and thread-winding means rotatably mounted at one side thereof and adapted to be driven by a suitable motive means under the control of the reader. The winding means is adapted to be operatively disconnected from the motive means to permit free rotation thereof, and is further adapted to be removed from its rotatable mounting. A thread of substantial length is adapted to be wound on the winding means when rotated, and clips are fastened to the thread at spaced intervals throughout substantially its length. The clips are adapted to be sequentially attached to the front marginal edge of successive pages of a book resting on the support. When rotated, the winding means pulls the thread across the face of the open book, and thereby the top right side page is turned by the pull of the thread on the clip attached to that page and the clip is then detached from the turned page. The turned page is held down and flat by the tautness of the thread between the winding means and the clip attached to the next page to be turned. The attachment of the clips to the front marginal edge of successive pages and the continuous unimpeded travel of the long thread with the clips fastened thereto across the face of the open book are characteristic features of the page turner. Preferably, a pivoted weighting means is provided to rest gently on the front margin of the top right side page of the open book, to hold that and the underlying pages down and flat. The weighting means is preferably combined with a spring member for firmly holding the back cover of the open book on the support, while permitting the front cover to move naturally as the pages are turned.

The foregoing and other novel features of the invention will be best understood from the following description taken in conjunction with the accompanying drawings, in which Figs. 1, 2 and 3 are explanatory perspective views illustrating the principle of operation of the page turner of the invention, Fig. 4 is a top plan of a page turner embodying the invention, Fig. 5 is a longitudinal sectional elevation on the section lines 5—5 of Fig. 4 and 5—5 of Fig. 6, Figs. 6 and 7 are transverse sectional elevations on the section lines 6—6 and 7—7, respectively, of Fig. 4, Fig. 8 is an enlarged sectional elevation on the section line 8—8 of Fig. 6, Fig. 9 is an end elevation of the page turner supported in an upright position by its retractable easel leg, Fig. 10 is an enlarged explanatory view of the left end of Fig. 6, Fig. 11 is a plan of a device for fastening thin, flat clips at uniformly spaced intervals to the thread, Figs. 12, 13 and 14 are explanatory views of the flat clip and the preferred way of fastening it to the thread, Figs. 15, 16 and 17 are explanatory views of the fastening of small round clips to the thread, Figs. 18, 19 and 20 are plan, end elevation and detail view, respectively, of a suitable control switch for the electric motive means driving the thread-winding means, Figs. 21 and 22 are explanatory perspective views of modified types of clips fastened to the thread.

Figs. 23 and 24 are plan and longitudinal elevation, respectively, of a slightly modified construction of page turner, and Figs. 25, 26 and 27 are electric circuit diagrams of the automatic control means for stopping the electric motive means of the device shown in Figs. 23 and 24.

Referring first to Figs. 1, 2 and 3, there is diagrammatically represented a rotatable winding means D adapted to be axially moved into friction clutch engagement (F) with a rotating motive means M, at the will of the reader. For the sake of simplicity, the winding means is herein usually referred to as a drum which is intended to include a reel, roller, tube and any winding device upon which the thread can be wound. A switch S is provided for initiating and interrupting the action of the motive means. A long thread T is wound upon the drum D when it is rotated by the motive means M (counterclockwise as viewed in Figs. 1, 2 and 3). The leading end of the thread is initially attached to the drum by any suitable fastening means such as a notch $f$. A multiplicity of small clips C, of the thin, flat and narrow metal type resembling a diminutive bobby pin, are fastened to the thread in spaced relation. The distance between the spaced clips is generally slightly greater than the overall width of the open book, that is slightly greater than twice the page width. A distance of about 12 inches between clips is suitable for the most common sizes of books, and about 100 spaced clips on the thread provides 200 pages of reading matter, and is usually a convenient number for the page turner.

The clips are first attached in sequence to the front marginal edge of successive pages of the book, the thread between adjacent clips (twelve inches or so) lying in an irregular line between the pages. Initially, the thread and its attached clips will usually be wound on the drum D, or upon an equivalent drum removed from its rotatable mounting in the page turner, and the first clip unwound is attached to the last page to be prepared for turning, and the remaining clips, as unwound, are attached in sequence to each successive page towards the front of the book. When the book is prepared with thread unwound from the drum D, the drum is axially moved away from the motive means M to disengage the friction clutch and permit "free wheeling" or free rotation of the drum during the operation of attaching the clips to successive pages. The clips are attached in staggered relation along the edges of the successive pages in order to uniformly distribute their effect in increasing the thickness of the book.

When the book is completely prepared, it is spread open, on a suitable support, at the page where reading is to commence, and the drum D is moved into friction clutch engagement with the motive means M. When the page is to be turned, the switch S is manually or otherwise closed by the reader and the drum begins to rotate at a relatively slow rate, conveniently about one revolution per second, so that the speed of travel of the thread is about 3 to 6 inches per second depending on the diameter of the drum. As the thread is wound on the drum, it is pulled across the face of the open book toward the left (Figs. 1, 2 and 3), and the top right side page is lifted by its clip and gradually turned over (Figs. 1 and 2). Continued movement of the thread pulls the clip off the turned page, and when the thread is taut across the pages, the switch S is opened and rotation of the drum ceases (Fig. 3). When the two open pages have been read, the operation is repeated, until all of the prepared pages have been turned, and the full length of the thread with its attached clips has been wound on the drum.

The thread T should be thin and as inconspicuous as possible, since it lies across the face of the open pages of the book, and should not unduly obscure the text or distract the reader's attention. As the force required to turn the page is insignificant, the thread need not be particularly strong. No. 20 spool white cotton thread is admirably adapted for the purpose.

The small clip of the bobby pin type should extend perpendicularly from the thread, and to this end it is preferably fastened to the thread by a double loop knot, illustrated in Figs. 13 and 14. To facilitate and insure such fastening of the clips to the thread, the fixture illustrated in Fig. 11 has been devised. This fixture comprises a base 30 of wood or the like, having a hole 31 in which the last clip on the thread is inserted. The thread is taken from a supply spool 32 and is wound around pins 33 and 34 projecting upwardly from the base, and the free end ($a$) of the thread is pulled through the loop ($b$) between the pins and hooked over a pin 35. A spring clip 36 presses against the pin 35 and prevents the string slipping off this pin and holds taut both the loop and the portion of the string between the pins 33 and 35. The free end of the thread may advantageously be held taut by a spring clip 36'. The clip C is then slipped over both threads of the loop $b$, until these threads are positioned together in the closed end of the clip. The thread is then slipped off pin 35 and the free end pulled taut, and then slipped off pin 34. Holding the clip alongside pin 33, the thread is pulled to the right forming a similar knot at each side of the closed end of the clip, as illustrated in Figs. 13 and 14. It is characteristic of this fastening that the clip extends perpendicularly from the thread as a consequence of the similar knots at each side of the closed end of the clip. By holding the clip alongside the pin 33 while completing the knot, the clips are fastened to the thread at substantially uniformly spaced intervals, determined by the distance between the hole 31 and the pin 33. The small flat clip has the advantage of being narrow as well as thin. This is a noteworthy point since the thickness of the "prepared" book depends on these dimensions. A suitable clip of this type is marketed by Geo. B. Graff Co., Cambridge, Mass., under the trade name Kling Klips.

Other types of clips and equivalent devices may be used in the page turner of the invention. By clip is herein meant, any device susceptible of ready attachment to the front marginal portion or edge of a page, capable of being conveniently fastened to the thread, and adapted to be pulled off or detached from the page by the light pull of the thread when wound on the drum. Among other types of small clips suitable for the purposes of the invention may be mentioned, merely by way of example, the conventional round paper clip of small size. Here again, the clip should be fastened to the thread so as to extend perpendicularly therefrom. This may be conveniently done by inserting a loop $d$ of the thread through the round clip C' (Figs. 15, 16 and 17), and slipping the loop over the two-pronged head of the clip, and drawing out the two ends of the loop and thus closing it (Fig. 16) to form the knot (Fig. 17).

Other means may be employed for attaching the thread at spaced intervals to successive pages of the book. For example, in Fig. 22 (Sheet I) the thread is looped around a thin strip C''' of adhesive tape, which is then adhesively attached to the margin of the right hand page. Or, the thread may be lightly attached to the page by spots of adhesive, as illustrated in Fig. 21 (Sheet I). Here, spots C" of adhesive attach the thread to the front and back margins of each left hand page of the book (when open). The two adhesive spots will therefore be on the underside of each right hand page of the open book. The thread T turns the page by pulling on the spot C" on the underside of the top right side page and when the page is turned the continued pull of the thread detaches the thread from its two points of attachment to the turned page. This manner of fastening the thread to the pages is particularly useful in the case of books pre-prepared by circulating libraries and publishers, and where the thread is not intended for reuse.

Figs. 4 to 10 of the drawings illustrate the page turner in its present preferred and complete form. The operative elements of the device are assembled on a base 37 preferably made of molded plastic material, although it may be made of wood, metal or other suitable material. As shown in the drawings, the base is molded of relatively thin plastic material and is generally rectangular in shape. Its top is for the most part flat for supporting the book. Near one end, the top has a recessed or depressed portion 38 for accommodating the rotatably mounted hollow drum D. The base rests on its integral depending sides and ends which enclose its generally hollow underside. The device may be used in a horizontal position, or it may be used in an inclined or upright position, like an easel, by pulling out the leg 39 which is pivoted to the underside of the base and in its retracted position is wholly within the hollow underside of the base (Figs. 5 and 9).

An electric motor M is secured to the under side of the base adjacent one end of the recess 38, and is connected through a suitable train of reducing gears 40 to a rotatably mounted cylindrical driving member 41 (Figs. 4, 6 and 8). The outer end of the rotatable member 41 has a cylindrical hub 42, of smaller diameter than the member 41, extending within and forming a spindle support for one end of the hollow drum D. The shoulder of the member 41, at its junction with the hub 42, is adapted to butt against and form a friction clutch engagement (F) with the adjacent end of the hollow drum D, the external diameters of the drum D and member 41 being substantially the same.

A circular plate having a protruding axially positioned bearing pin 43 is secured to the other end of the drum D. The bearing pin 43 extends through an aperture in a plate 44 adapted to occupy any one of three positions. Thus, the plate is fastened to the bottom of the recess 38 by two spaced lugs 45 which pass through the bottom and are turned over. The plate is thus capable of a slight swinging movement about the turned-over lugs 45. Two spaced springs 46 normally press the plate 44 against the adjacent end of the drum and hence press the other end of the drum into friction clutch engagement with the shoulder of the rotatable member 41. The drum is thus operatively connected to the member 41 and is rotated by the motor M when energized. When the plate 44 is retracted a slight distance from the adjacent end of the drum, sufficiently to disengage the other end of the drum from the rotatable member 41, the notched end of a spring pressed latch 47 (Figs. 4, 5 and 10) slips behind the plate and holds it in its thus retracted position. The latch 47 is positioned in a slot or recess in the side wall of the recess 38, and is pivoted at one end (48), while a spring 49 presses its other end against the adjacent side edge of the plate 44. When the plate is held in its retracted position by the notched end of the latch 47, the drum is mounted for "free wheeling," and may therefore be freely turned in either direction. Further retraction of the plate 44, away from the adjacent end of the drum, permits the bearing pin 43 to be removed from the aperture in the plate, and the drum to be removed from its rotatable mounting in the recess 38. A tapering guide groove 50 extending from the top of the plate 44 to the bearing aperture therein facilitates insertion of the bearing pin 43 in the bearing aperture when the drum is replaced in its rotatable mounting in the recess 38. By pressing the latch 47 back into its recess, its notched end is drawn back sufficiently to permit the plate 44 to press against the drum and operatively engage the rotatable member 41 therewith.

The ready removal of the drum from its rotatable mounting is advantageous, since it permits a partially read book with remaining prepared pages to be laid aside with the removed drum and what thread has been wound thereon, and replaced in the page turner by another book and drum. Any number of partially read books with remaining prepared pages and cooperating drums may thus be held in readiness for use with the page turner. Since each page turner may thus have a number of drums, it is advisable to make the drum as simple and cheap as possible, and to simplify its rotatable mounting and operative connection to the motor. To this end, the drum itself may be merely a tube of card or fiber board with the bearing pin 43 and its plate replaced by a resiliently mounted spindle, similar to the spindle 42, adapted to rotatably support this end of the tube and to be retracted to permit removal of the tube.

A removable L-shaped book holder is provided to occupy any one of several positions on the flat top surface of the base 37. This book holder comprises two arms 51—51' and 52 firmly secured together at a right angle. The longitudinal or base arm is composed of two longitudinally adjacent parts, the lower part 51 being of greater thickness than the upper part 51'. The shoulder on the thicker part 51, at the junction of the two parts, provides a rest rail or ledge for the book. An elongated spring member 53 is secured at one end to the thinner part 51, and extends lengthwise along this part. The spring member 53 is adapted to be slipped over the lower edge of the back cover of the book to hold the book firmly on the support.

A thin light-weight plate 54, or equivalent weighting member, is pivotally mounted (55) near one side edge to the tranverse arm 52. The plate 54 is preferably transparent, and may advantageously be a thin plate of Lucite. It swings freely on its pivots 55 and when the device is used in a horizontal position the weight of the plate is sufficient to bias its free side towards the base 37. However, it is preferable to augment the natural biasing action of gravity by light springs 56, connected between each pivot 55 and a pin 57 protruding from the end edge of the plate a short distance from the pivot. The springs 56 exert a slight positive bias on the free side of the plate towards the base 37, which is useful when the device is used in an upright position, and at the same time the plate can be easily moved about its pivots through an angle of 180 degrees.

The plate 54 overlies the margin of the right page of the open book, and by its bias towards the base 37 presses down on this page and all prepared pages underneath, and thus holds these pages flat and compact (Fig. 5). When transparent, the plate in no way distracts the attention of the reader. The book is held by the spring member 53 with its back cover relatively stationary, and the plate 54 is initially positioned so that the edge of its free swinging side extends almost but not quite to the printed text of the right page of the open book. When that page is turned, the pull of the thread first slips the edge of the page from underneath the plate, and the plate rests upon the next prepared right page. Due to the arcual path (indicated by the dotted lines in Fig. 5) of the free edge of the plate 54 as the thickness of the prepared pages is decreased in page-turning, and the fact that the back cover of the book is held relatively stationary by the spring member 53, the distance between the free edge of the plate and the printed text remains practically constant or increases slightly, thus eliminating any possibility of the plate extending over any of the text, as might happen if the left cover of the book, rather than the right cover, were held stationary.

The plate 54, or equivalent weighting member, is so pivoted or hinged that its free edge rests on the front margin of the top right side page and remains always a short distance from the edge of the page without extending into the printed text of the page. It thus prevents this page from turning partially and thereby making reading difficult. The top right side page has a tendency to turn partially due to the stiffness of the book-binding and also to drafts of air. The spring member 53 holds the right side or back cover of the book so that the relation of the right side edges of the prepared pages to the edge of the weighting member remains practically constant. With the right side pages held flat and compact by the weighting member, and the left side pages held down and flat by the tautness of the thread between the drum and the next clip to be detached, easy reading of the open book is assured in either a horizontal or upright position of the page turner.

The L-shaped book holder is adjustably mounted on the top of the base 37 to accommodate books of different widths. Thus, small L-shaped pins or hooks 58 and 59 protrude from the under side of the arms 51 and 52, respectively, near their ends. The pins 58 and 59 are adapted to be inserted in any one of a series of spaced cooperating elongated openings 60 and 60', respectively, in the top of the base 37. When the pins 58 and 59 have been inserted in corresponding openings 60 and 60', respectively, the book holder is locked in position by a slight forward movement, as viewed in Fig. 4. The book holder may be removed from the support when reading magazines, newspapers and the like which do not require a weighting member or book-holding spring member. A pin 61 is removably inserted in an appropriate hole in the top of the base 37 approximate the recess 38, for guiding the thread, more particularly when the device is used in an upright position.

The electric contact of the switch S for initiating and interrupting the action of the electromotive means M must be capable of being operated, that is closed and opened, in a variety of ways, depending largely upon the physical condition of the reader. Thus, it should be capable of operation by the hand, between the knees, with the shoulder or with the chin, as a foot pedal, or otherwise, all of which ways of operation are herein embraced under the expression "manually operated," in the interest of simplicity. A suitable switch of this type is shown in Figs. 18, 19 and 20, and comprises two flat plates 62 and 63 hinged at one end by loose fitting screws 64. One of the spring contact members 65 normally presses the plate 62 against the head of a stop pin 66. When the plate 62 is lightly pressed towards the plate 63, the end of the spring contact member 65 engages a stationary contact member 67, and closes the electric circuit 68 of the electromotive means M.

In order to locate the switch in a convenient position under the chin, a cord 69 having terminal plugs 69' is provided. The cord is threaded with a friction fit through a hole in a shoulder 70 extending from one side of the plate 63, so that the length of the loop may be adjusted. The other end of the cord is slipped into a slot 71 in the end of a shoulder 72 extending from the other side of the plate 63, and the terminal plug 69' of this end of the cord is pulled into a pocket 73 in the shoulder 72 to prevent the cord slipping out of the slot 71.

The operation of the page turner of the invention will, it is believed, be understood from the foregoing description. It will be understood, that the switch S is conveniently positioned to be manually operated in accordance with the physical ability of the reader. With the book prepared, as hereinbefore described, and lying open on its support, the operator closes the contacts 65 and 66 and holds the contacts closed until the page has been turned and the leading clip pulled off the turned page, as illustrated in Fig. 3. With a little experience, the operator becomes very proficient in maintaining the contacts closed for the necessary time interval to complete the turning of the page. The thread and clips are unimpededly wound upon the drum D, as the prepared pages are turned. With the easel leg 39, the book may occupy a nearly vertical position, and the pages will still remain practically flat due to the action of the plate 54, on one side, and the fairly taut thread on the other side. The turning over of the pages in a nearly vertical position is accomplished with as much ease as in a horizontal position, and the thread guide pin 61 prevents the thread from dropping and guides its satisfactorily onto the rotating drum. By the provision of suitably positioned double mirrors, a reader in a recumbent position in a respirator can satisfactorily use the page turner supported in a horizontal position at the back of the reader's head.

Where the reader is unable through physical disability to hold the switch S closed during the interval of page turning, as is frequently the case with persons afflicted with palsy, the electric circuit of the drum driving motor may be automatically held closed for the necessary interval following a practically instantaneous closing of a manually-operated switch. Figs. 23 and 24 illustrate one means for accomplishing this result. The thread T travels from the book between two upright guide pins 74 upon a drum D' rotatably mounted with its axis upright. The paper clips C, in their travel between the pins 74 and the drum D', pass between a base block 75 and a spring contact shoe 76. The clip C when interposed between the block 75 and shoe 76 is of sufficient thickness to break or open the contacts of the switch S'. When a page is to be turned, the reader has merely to momentarily close the contacts of the switch S' thereby completing the electric circuit of the motor M' (Fig. 25) and initiating rotation of the drum D', whereupon the clip C is withdrawn by the thread T from under the shoe 76, and the switch contacts are then held closed by the spring tension of the shoe until the following clip C reaches and lifts the shoe and thereby opens the contacts of the switch and terminates the cycle of page turning.

The drum D' is of larger diameter and of shorter length than the drum D of the device shown in Figs. 4 to 10, and is adapted to be slipped on and driven by an upstanding shaft 77 operatively connected to the motor M'. To permit "free wheeling" of the drum D', it may be taken off the shaft 77, turned 180 degrees, and slipped on a "free wheeling" shaft 78. In Figs. 23 and 24, the weighting member 54' comprises a plurality of stiff wires or the like secured at one end to the common pivoted bar and having slightly upturned free ends adapted to rest gently on the front margin of the top right side page of the open book.

If a still shorter interval of manually-made contact is necessary or desirable, a relay 78 may be included in the circuit of the switch S', as indicated in the circuit diagram of Fig. 26. The relay 78 is of the slow release type, and when energized its armature closes the contacts 79 and holds them closed for the interval required for the thread T to withdraw the clip C from under the contact shoe 76, whereupon the motor circuit contacts 80 close, and remain closed until the following clip C reaches and lifts the shoe 76, and the cycle of page turning is completed.

In the circuit diagram shown in Fig. 27, the slow release feature of the relay 78 is not relied upon to hold the contacts 79 closed until the clip C has been withdrawn from under the contact shoe 76, since auxiliary motor and relay contacts 81 and 82, respectively, are provided to the same end. When the relay momentarily closes the contacts 79', it simultaneously closes the contacts 81 thereby completing the circuit of the motor M'. At the same time, closing of the contacts 79' insures continued energization of the relay 78 through an auxiliary circuit including the contacts 82 which are closed by the contact shoe 76 when in its elevated position and are held closed so long as the clip C is interposed between the block 75 and the contact shoe. When the clip is withdrawn by the thread T from under the contact shoe 76, the spring tension of the shoe closes the contacts 80, thereby maintaining the motor circuit closed until the next clip reaches and lifts the shoe, and opens the contacts 82, thereby deenergizing the relay 78 and restoring the contacts 81 to their open position. The contacts 80 and 82 are of the "make-before-break" type, that is contacts 80 are made before contacts 82 are broken.

In Figs. 23 and 24, the switch S' is shown mounted on the base of the page turner, solely for the purposes of explanation. The switch so positioned could not be conveniently operated by the reader, but is actuated by remote control through any suitable agency therefor. Similarly, the switch S' of Figs. 25, 26 and 27 is actuated through any appropriate remote control agency susceptible of convenient operation by the reader.

I claim:

1. A mechanical page turner, comprising a support for a book, winding means rotatably mounted approximate one side of the support, a thread of substantial length having a multiplicity of clips fastened thereto at spaced intervals and adapted to be unimpededly pulled across the face of an open book on said support and wound on the winding means when rotated said clips being adapted to be sequentially attached to successive pages of the book for turning the pages in sequence as said thread is wound on said winding means, motive means for rotating said winding means, and means for starting and stopping said motive means.

2. A mechanical page turner, comprising a support for a book, a thread of substantial length, a multiplicity of clips fastened to the thread at spaced intervals and adapted to be sequentially attached to the front marginal edge of successive pages of a book on said support, winding means rotatably mounted approximate one side of the support and adapted when rotated to unimpededly pull said thread and the clips fastened thereto across the face of the open book to turn the pages thereof in sequence, motive means for rotating said winding means, and means for starting and stopping said motive means.

3. A mechanical page turner, comprising a support for a book, winding means rotatably mounted approximate one side of the support, a thread of substantial length having a multiplicity of clips fastened thereto at spaced intervals and adapted to be unimpededly pulled across the face of an open book on said support and wound on the winding means when rotated, said clips being adapted to be sequentially attached to the front marginal edge of successive pages of the book for turning the pages in sequence when said thread is pulled across the face of the open book, electromotive means for rotating said winding means, and means for initiating and stopping the action of said electromotive means.

4. A mechanical page turner comprising a support for a book, a thread of substantial length having a multiplicity of clips fastened thereto at substantially uniformly spaced intervals and adapted to be sequentially attached to the front marginal edge of successive pages of a book on the support, a rotatably mounted winding means for said thread adapted when rotated to pull the thread across the face of the open book to turn the pages thereof in sequence and to detach the clip from each page after it is turned, motive means for rotating said winding means, and means for starting and stopping said motive means.

5. A mechanical page turner comprising a support for a book, winding means rotatably mounted approximate one side of the support, a thread adapted to be wound on the winding means when rotated, a multiplicity of clips fastened to the thread at substantially uniformly spaced intervals, electromotive means for rotating said winding means, said clips being adapted to be sequentially attached to successive pages of a book on said support for turning the pages in sequence as said thread is wound on said winding means, manually-operable means for energizing said electromotive means, and automatic means controlled by the travel of said thread for deenergizing said electromotive means.

6. A mechanical page turner, comprising a support for a book, a thread of substantial length, a multiplicity of small thin and narrow clips fastened to the thread at spaced intervals and extending perpendicularly therefrom and adapted to be sequentially attached to the marginal front edge of successive pages of a book on said support, winding means rotatably mounted approximate one side of the support and adapted when rotated to unimpededly pull said thread and the clips fastened thereto across the face of the open book to turn the pages thereof in sequence, motive means for rotating said winding means, and means for starting and stopping said motive means.

7. A mechanical page turner, comprising a support for a book, a thread of substantial length, a multiplicity of small clips resembling diminutive bobby pins fastened at their closed ends to the thread in spaced relation with one another and adapted to be sequentially attached to the front marginal edge of successive pages of a book on said support, each of said clips being fastened to the thread by a similar knot at each side of its closed end so as to extend perpendicularly from the thread, winding means rotatably mounted approximate one side of the support and adapted when rotated to unimpededly pull said thread and the clips fastened thereto across the face of the open book on the support to turn the pages thereof in sequence, motive means for rotating said winding means, and means for starting and stopping said motive means.

8. A mechanical page turner, comprising a support for a book, a thread of substantial length, a multiplicity of clips fastened to the thread at substantially uniformly spaced intervals and adapted to be sequentially attached to the front marginal edge of successive pages of a book on the support, winding means rotatably mounted approximate one side of the support and adapted when rotated to pull said thread and the clips fastened thereto across the face of the open book and to turn the top right side page by the pull of the thread on the clip attached to that page and to detach the clip from the turned page, the tautness of the thread between the winding means and the clip attached to the next succeeding page being adapted to hold the turned page down and flat, motive means for rotating said drum, and means for starting and stopping said motive means.

9. A mechanical page turner, comprising a support for a book, a thread of substantial length having a multiplicity of clips fastened thereto at substantially uniformly spaced intervals and adapted to be sequentially attached to the front marginal edge of successive pages of a book on the support, a rotatably mounted winding means for said thread adapted when rotated to pull the thread across the face of the open book to turn the pages thereof in sequence and to detach the clip from each page after it is turned, a guide for directing the thread onto said winding means when the page turner is in an upright position, motive means for rotating said winding means, and means for starting and stopping said motive means.

10. A mechanical page turner, comprising a support for a book, a thread of substantial length having a multiplicity of clips fastened thereto at substantially uniformly spaced intervals and adapted to be sequentially attached to the front marginal edge of successive pages of a book on the support, a rotatably mounted winding means for said thread adapted when rotated to pull the thread across the face of the open book to turn the pages thereof in sequence and to detach the clip from each page after it is turned, a pivoted weighting member adapted to rest on the front margin of the top right side page of the open book, motive means for rotating said winding means, and means for starting and stopping said motive means.

11. A mechanical page turner, comprising a support for a book, a thread of substantial length having a multiplicity of clips fastened thereto at substantially uniformly spaced intervals and adapted to be sequentially attached to the front marginal edge of successive pages of a book on the support, a rotatably mounted winding means for said thread adapted to hold the thread taut across the face of the open book and when rotated to turn the top right side page by the pull of the thread on the clip attached thereto and to detach the clip from the turned page, motive means for rotating said winding means, and means independent of the other operative elements of the page turner for starting and stopping said motive means.

12. A mechanical page turner, comprising a support for a book, a thread of substantial length having a multiplicity of clips fastened thereto at substantially uniformly spaced intervals and adapted to be sequentially attached to the front marginal edge of successive pages of a book on the support, a rotatably mounted winding means for said thread adapted when rotated to pull the thread across the face of the open book to turn the pages thereof in sequence and to detach the clip from each page after it is turned, an electric motor for rotating said winding means, and a switch electrically connected to said motor and adapted to be hung around the neck of the reader and actuated by movement of the reader's head to start and stop said motor.

13. A mechanical page turner, comprising a support for a book, winding means rotatably mounted on the support approximate the left side thereof, a thread of substantial length adapted to be wound on the winding means when rotated, clips fastened to the thread at spaced intervals throughout substantially its length, said clips being adapted to be sequentially attached to successive pages of a book on said support for turning the pages in sequence as said thread is wound on said winding means, a pivotally mounted weighting member on the support adapted to overlie the front margin of the right side page of an open book resting on the support and gently biased to hold that page down, motive means for rotating said winding means, and means for starting and stopping said motive means.

14. A mechanical page turner, comprising a support for a book, winding means rotatably mounted on the support approximate the left side thereof, a thread of substantial length adapted to be wound on the winding means when rotated, clips fastened to the thread at substantially uniformly spaced intervals, said clips being adapted to be sequentially attached to successive pages of a book on said support for turning the pages in sequence as said thread is wound on said winding means, a holding member adapted to be mounted on the support at a plurality of different positions varying in distance from said winding means, a weighting member pivotally mounted on said holding member and adapted to overlie the front margin of the right side page of an open book resting on the support and gently biased to hold that page down, motive means for rotating said winding means, and means for starting and stopping said motive means.

15. A mechanical page turner, comprising a support for a book, a thread of substantial length having a multiplicity of clips fastened thereto at substantially uniformly spaced intervals and adapted to be sequentially attached to the front marginal edge of successive pages of a book on the support, a rotatably mounted winding means for said thread adapted when rotated to pull the thread across the face of the open book to turn the pages thereof in sequence and to detach the clip from each page after it is turned, a book holder adapted to be adjustably mounted on said support and having a spring member for firmly holding the book on the support and a pivoted weighting member adapted to gently rest on the front margin of the top right side page of the open book, motive means for rotating said winding means, and means for starting and stopping said motive means.

16. A mechanical page turner, comprising a support for a book, a thread of substantial length having a multiplicity of clips fastened thereto at substantially uniformly spaced intervals and adapted to be sequentially attached to the front marginal edge of successive pages of a book on the support, a rotatably mounted winding means for said thread adapted when rotated to pull the thread across the face of the open book to turn the pages thereof in sequence and to detach the clip from each page after it is turned, a book holder comprising two perpendicularly positioned arms adapted to be adjustably mounted on said support and having a spring member on one arm for firmly holding the back of the book on the support while permitting the front to move as the pages are turned, a weighting member pivotally mounted on the other arm of said holder and adapted to gently rest on the front margin of the top right side page of the open book, motive means for rotating said winding means, and means for starting and stopping said motive means.

17. A mechanical page turner, comprising a support for a book, a thread of substantial length, a multiplicity of clips fastened to the thread at substantially uniformly spaced intervals and adapted to be sequentially attached to the front marginal edge of successive pages of a book on the support, winding means rotatably mounted approximate one side of the support and adapted when rotated to pull said thread and the clips fastened thereto across the face of the open book and to turn the top right side page by the pull of the thread on the clip attached to that page and to detach the clip from the turned page, the tautness of the thread between the winding means and the clip attached to the next succeeding page being adapted to hold the turned page down and flat, a holding member adapted to be mounted on the support at a plurality of different positions varying in distance from said winding means, a weighting member pivotally mounted on said holding member and adapted to overlie the front margin of the right side page of the open book and gently biased to hold that page down, motive means for rotating said winding means, and means for starting and stopping said motive means.

18. A mechanical page turner, comprising a support for a book, a drum, a rotatable member having a cylindrical spindle extending within and rotatably supporting one end of said drum and further having a shoulder adapted to make a friction clutch engagement with the adjacent end of the drum, a movable support for the other end of the drum having three operative positions in the first of which the drum is operatively connected to said rotatable member by the aforesaid friction clutch engagement and in the second of which the drum is freely rotatable and in the third of which the drum can be removed from its supports, motive means operatively connected to said rotatable member, a thread of substantial length adapted to be wound on the drum when rotated, clips fastened to the thread at spaced intervals throughout substantially its length and adapted to be sequentially attached to successive pages of a book on said support for turning the pages in sequence as said thread is wound on said drum, and means for starting and stopping said motive means.

19. A mechanical page turner, comprising a support for a book, a thread of substantial length having a multiplicity of clips fastened thereto at substantially uniformly spaced intervals and adapted to be sequentially attached to the front marginal edge of successive pages of a book on the support, a rotatably mounted winding means for said thread adapted to hold the thread taut across the face of the open book and when rotated to turn the top right side page by the pull of the thread on the clip attached thereto and to detach the clip from the turned page, a guide for directing the thread onto said winding means when the page turner is in an upright position, a book holder comprising two perpendicularly positioned arms adapted to be adjustably mounted on the support and having a spring member on one arm for firmly holding the back of the book on the support while permitting the front to move as the pages are turned, a weighting member pivotally mounted on the other arm of said holder and adapted to gently rest on the front margin of the top right side page of the open book, an electric motor for rotating said winding means, and a switch electrically connected to said motor and adapted to be actuated by the reader for starting and stopping said motor.

20. The combination with a mechanical page turner having a book support and adapted to turn in numerical sequence the pages of an open book resting on the support, of a book holder comprising two perpendicularly positioned arms adapted to be adjustably mounted on the support and having a spring member on one arm for firmly holding the back of the book on the support while permitting the front to move as the pages are turned, and a weighting member pivotally mounted on the other arm of said holder and adapted to gently rest on the front margin of the top right side page of the open book.

RUDOLPH F. MALLINA.

REFERENCES CITED

The following references are of record in the file of this patent:

UNITED STATES PATENTS

| Number | Name | Date |
|---|---|---|
| 230,780 | Hurd et al. | Aug. 3, 1880 |
| 954,272 | Elliott | Apr. 5, 1910 |
| 1,351,707 | Sullivan | Aug. 31, 1920 |